United States Patent
Mathe

(10) Patent No.: US 8,013,862 B2
(45) Date of Patent: Sep. 6, 2011

(54) TEXTURE CODEC

(75) Inventor: Zsolt Mathe, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 11/941,337

(22) Filed: Nov. 16, 2007

(65) Prior Publication Data
US 2009/0128576 A1    May 21, 2009

(51) Int. Cl.
*G09G 5/00* (2006.01)
(52) U.S. Cl. .................................... 345/582; 345/586
(58) Field of Classification Search .................. 345/582; 382/166
See application file for complete search history.

(56) References Cited

U.S. PATENT DOCUMENTS

| | | | |
|---|---|---|---|
| 6,292,194 B1 | 9/2001 | Powell, III | 345/430 |
| 6,618,444 B1 * | 9/2003 | Haskell et al. | 375/240.24 |
| 6,819,793 B1 | 11/2004 | Reshetov et al. | 382/166 |
| 6,959,110 B1 | 10/2005 | Danskin et al. | 382/166 |
| 7,171,051 B1 | 1/2007 | Moreton et al. | 382/233 |
| 7,190,284 B1 | 3/2007 | Dye et al. | 341/51 |
| 7,239,743 B2 | 7/2007 | Gardella et al. | 382/166 |
| 7,242,432 B2 * | 7/2007 | Watanabe | 348/333.11 |
| 7,242,811 B2 | 7/2007 | Fenney | 382/240 |
| 7,307,639 B1 * | 12/2007 | Dumitras et al. | 345/582 |
| 7,385,611 B1 * | 6/2008 | Toksvig et al. | 345/582 |
| 7,397,946 B2 * | 7/2008 | Reshetov et al. | 382/166 |
| 7,636,471 B2 * | 12/2009 | Strom et al. | 382/166 |
| 2002/0171701 A1 * | 11/2002 | Shinada et al. | 347/19 |
| 2004/0151372 A1 * | 8/2004 | Reshetov et al. | 382/166 |
| 2004/0227552 A1 * | 11/2004 | Markovic et al. | 327/215 |
| 2005/0206784 A1 * | 9/2005 | Li et al. | 348/441 |
| 2006/0017722 A1 | 1/2006 | Hong et al. | 345/419 |
| 2006/0092169 A1 | 5/2006 | Wetzel | 345/582 |
| 2006/0268990 A1 * | 11/2006 | Lin et al. | 375/240.24 |
| 2007/0070083 A1 * | 3/2007 | Fouladi et al. | 345/604 |
| 2007/0140554 A1 * | 6/2007 | Strom et al. | 382/166 |
| 2007/0172120 A1 | 7/2007 | Roimela et al. | 382/166 |
| 2007/0242086 A1 * | 10/2007 | Tsujimoto et al. | 345/632 |

OTHER PUBLICATIONS

DXTex Tool, © 2007, http://msdn.microsoft.com/archive, 3 pages, date unknown.
van Waveren, J.M.P., "Real-Time DXT Compression", May 20, 2006, http://cache-www.intel.com, 43 pages.
van Waveren, J.M.P., "Real-Time Texture Streaming & Decompression", Nov. 11, 2006, http://softwarecommunity.intel.com, 57 pages.

* cited by examiner

*Primary Examiner* — M Good Johnson
(74) *Attorney, Agent, or Firm* — Woodcock Washburn LLP

(57) ABSTRACT

Techniques for pre-processing image blocks containing texture are disclosed herein which reduce memory requirements without degradation of quality. This is accomplished by determining the level of texture in each pixel block of the image and then performing a compression algorithm on such pixel block. Various methods are available to determine the texture level, including identifying the luminescence variation or difference within the pixel block. Depending on the amount of texture level contained within each pixel block, pre-processing may involve assigning the pixel block a single color or replacing the pixel block with an interpolated pixel block. Pre-processing on the pixel block may not be performed when the texture level therein is determined to be at a predetermined amount or level. Additional techniques are also disclosed herein which involve full processing of an image block.

20 Claims, 4 Drawing Sheets

TEXTURE CODEC

BACKGROUND

Currently there is great need for texture compression to enable high-definition content to be accessed on various entertainment devices. On many of these entertainment devices, disc space limitations and the need for streaming performance is contributing to this requirement. Furthermore, decompression time also needs to be very fast to ensure a smooth accessibility of the content. Thus, there is a need for improved texture codec that can be used in combination with conventional lossless codecs to reduce the storage space required for content while still enabling compression and decompression to be performed quickly. It is further desired that this improved codec can be integrated into an asset build pipeline and can be used in combination with hardware compression and decompression.

SUMMARY

Techniques for pre-processing image blocks containing texture are disclosed herein which reduce memory requirements without degradation of quality. This is accomplished by determining the level of texture in each pixel block of the image and then performing a compression algorithm on such pixel block. It will be appreciated that various methods are available to determine the texture level, including identifying the luminescence variation or difference within the pixel block. Depending on the amount of texture level contained within each pixel block, pre-processing may involve assigning the pixel block a single color or replacing the pixel block with an interpolated pixel block. Of course, pre-processing on the pixel block may not be performed when the texture level therein is determined to be at a predetermined amount or level.

Additional techniques are also disclosed herein which involve full processing of an image block. This essentially involves the conversion of the pixel block from a standard configuration (4×4) to a larger configuration (8×8) prior to pre-processing and then a conversion back to the standard configuration after decompression.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

Figure 1:
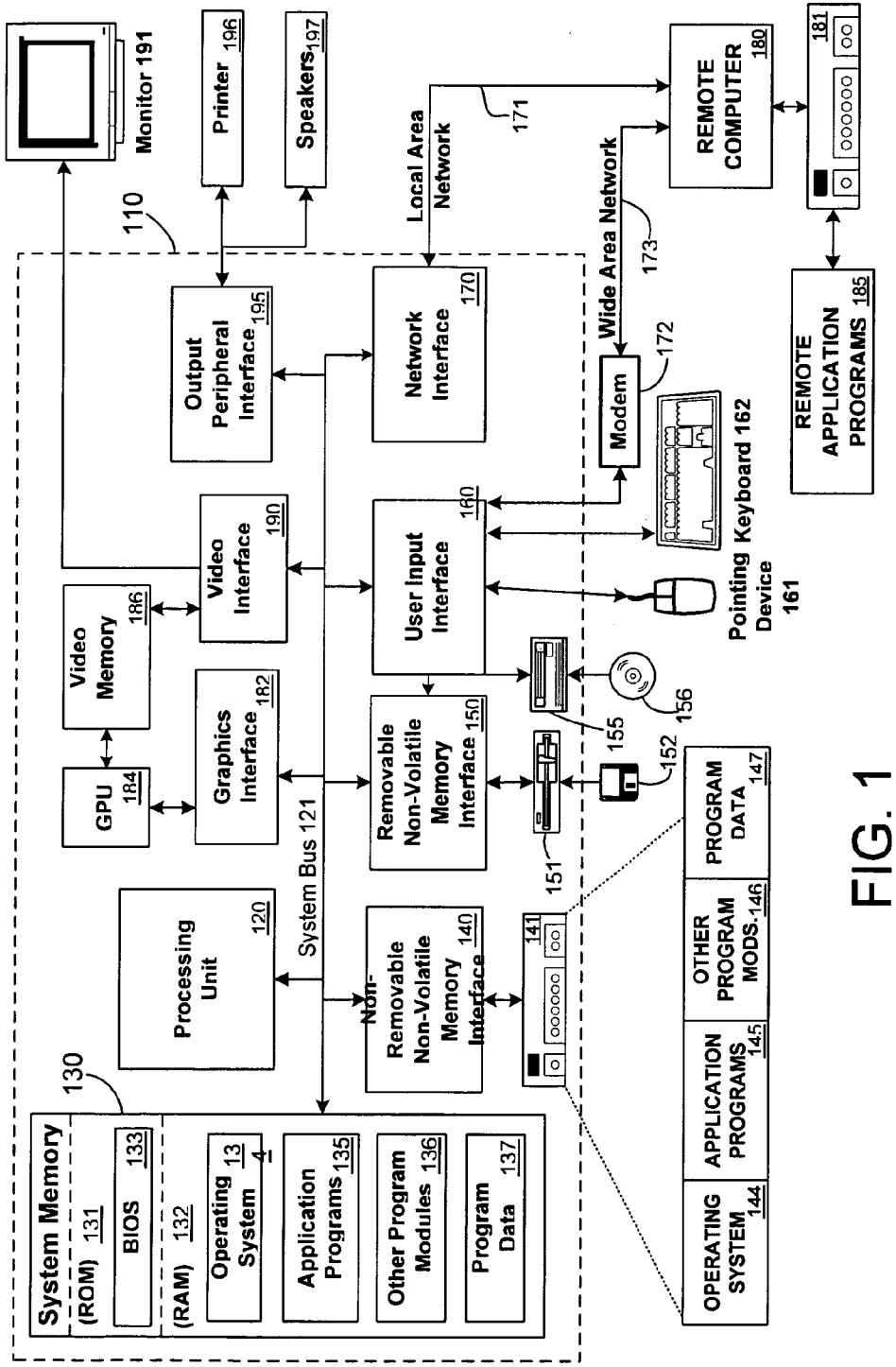
FIG. 1 is a block diagram of an exemplary computing device configured to implement a process for compressing images.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies FIG. 1 illustrates an example of a suitable computing system environment 100 in which the subject matter described above may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 1, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Typically, an image is transformed into blocks of pixels utilizing a DXT texture format. For example, in DXT1 compression, images are divided into 4×4 pixel blocks, or "texels". For each texel, two color values are chosen to represent the range of pixel colors within that block, and then each pixel is mapped to one of four possible colors (two bits) within that range. The compressed texel is represented by the two 16-bit color values, and 16 2-bit pixel values, totaling 64 bits of data per texel, amounting to an overall image size of 4 bits per pixel. DXT pixel blocks are compressed by a lossless coder/decoder (e.g., an LZX), such as a video encoder/video codec in a game console. It will be understood, however, that texture compression is also needed in order to enable high-definition content on various displays and entertainment devices. LZX is a lossless entropy codec based on the Lempel-Ziv sliding window codec. Lempel-Ziv based codecs compress data by building a dictionary of redundant patterns. The compressed data contains the codes to each patterns in a more compact form as the code takes up less bits than the pattern itself. During decompression the original data is built by dictionary lookup. It should be noted, however that any lossless compression codec, not just LZX, is suitable for compressing DXT textures, pre-processed textures, and 8×8 block converted textures.

Figure 2:
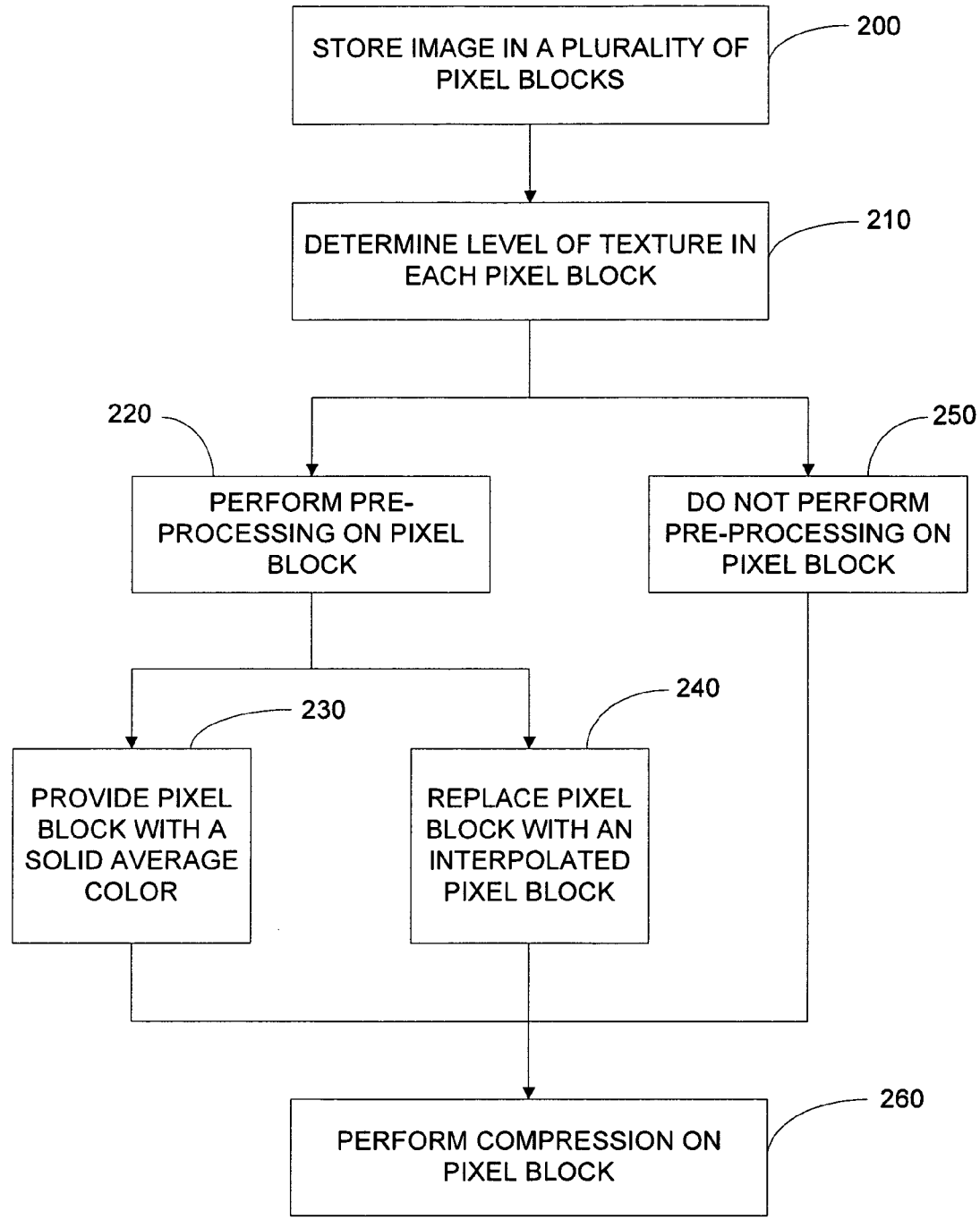
FIG. 2 is a flow diagram of an exemplary process for providing pre-compression of images.

In order to provide memory savings over unprocessed DXT textures compressed with a lossless coder/decoder, a method has been developed to pre-process such textures that works in accordance with the lossless coder/decoder. The method is able to work on standard DXT texture blocks and is easily integrated into an asset build pipeline. As seen in FIG. 2, an image is stored in a plurality of pixel blocks (box 200). It will be understood that the texture level for each pixel block is then determined (box 210), which is accomplished in any suitable manner. In one example, a first color is identified in the pixel block which has the highest luminescence value, a second color in the pixel block is identified in the pixel block which has the lowest luminescence value, a luminescence difference between the highest and lowest luminescence values is determined, and then this luminescence difference is translated or correlated into a texture level for the pixel block. Another term for colors having the highest and lowest luminescence in a pixel block is anchor colors.

Another manner of determining texture level in pixel blocks that have a DXT1 through DXT5 format is to convert the anchor colors in the pixel block to YUV color space. The Y channel (luminescence) difference is then used to derive the amount of texture level in the pixel block. Additionally, for pixel blocks having a DXT5 format, an alpha anchor value difference is preferably determined and used to evaluate the texture level therein. When the pixel blocks are formatted according to DXT1, an alternative manner of determining texture level therein involves evaluating the transparency therein. Contrary to other codecs, it will be appreciated that the present method evaluates non-pattern areas of the image instead of pattern (or texture) areas.

Provided the pixel block has less than a first predetermined amount of texture level, otherwise known herein as a color threshold (derived, for example, from an input color quality parameter), then pre-processing is performed on the pixel block (box 220). Depending on the texture level determined, pre-processing the pixel block involves assigning it a single (i.e., solid) color (box 230). This preferably involves an average color for the pixel block. If the texture level is determined to be less than a second predetermined amount (e.g., an amount that is derived from the first predetermined amount by, for example, a fixed ratio or other suitable formula), then pre-processing of the pixel block involves replacing it with an interpolated pixel block (box 240). The second predetermined amount is chosen such that pixel blocks with higher texture level than the first predetermined amount are processed. More specifically, the original pixel block will generally have a 4×4 configuration (i.e., 16 pixels), which is the standard block size generated by the DXT texture format, the solid color block will have a single pixel scaled up to a 4×4 configuration, and the interpolated pixel block will preferably have a 2×2 configuration (i.e., 4 interpolated pixels scaled up to 16 pixels). It will be appreciated that the interpolated pixel block will have less resolution than the original pixel block, but this is considered acceptable due to the low amount of texture in the pixel block.

Of course, should the pixel block have at least the predetermined amount of texture level therein, as identified by the determination step in box 210, then it is preferred that no pre-processing be performed on the pixel block (box 250). Whether pre-processing is performed on the pixel block or not, the pixel block generally will have compression performed thereon (box 260), such as by a lossless codec.

It will be appreciated that pre-processing the pixel block does not modify the DXT texture format. Further, the texture entropy is reduced in the pixel block so that additional lossless compression achieves greater compression ratios. This method of pre-processing is very beneficial for any real-time application since it does not use any floating point arithmetic or any cosine/Fourier transforms. Thus, pre-processing the pixel blocks provides the same quality when the image is displayed but at a faster speed since there is no decompressing component in the software. The preprocessed texture has no or very little visual degradation in quality, depending on the input parameters, that is the color and the alpha thresholds.

Figure 4:
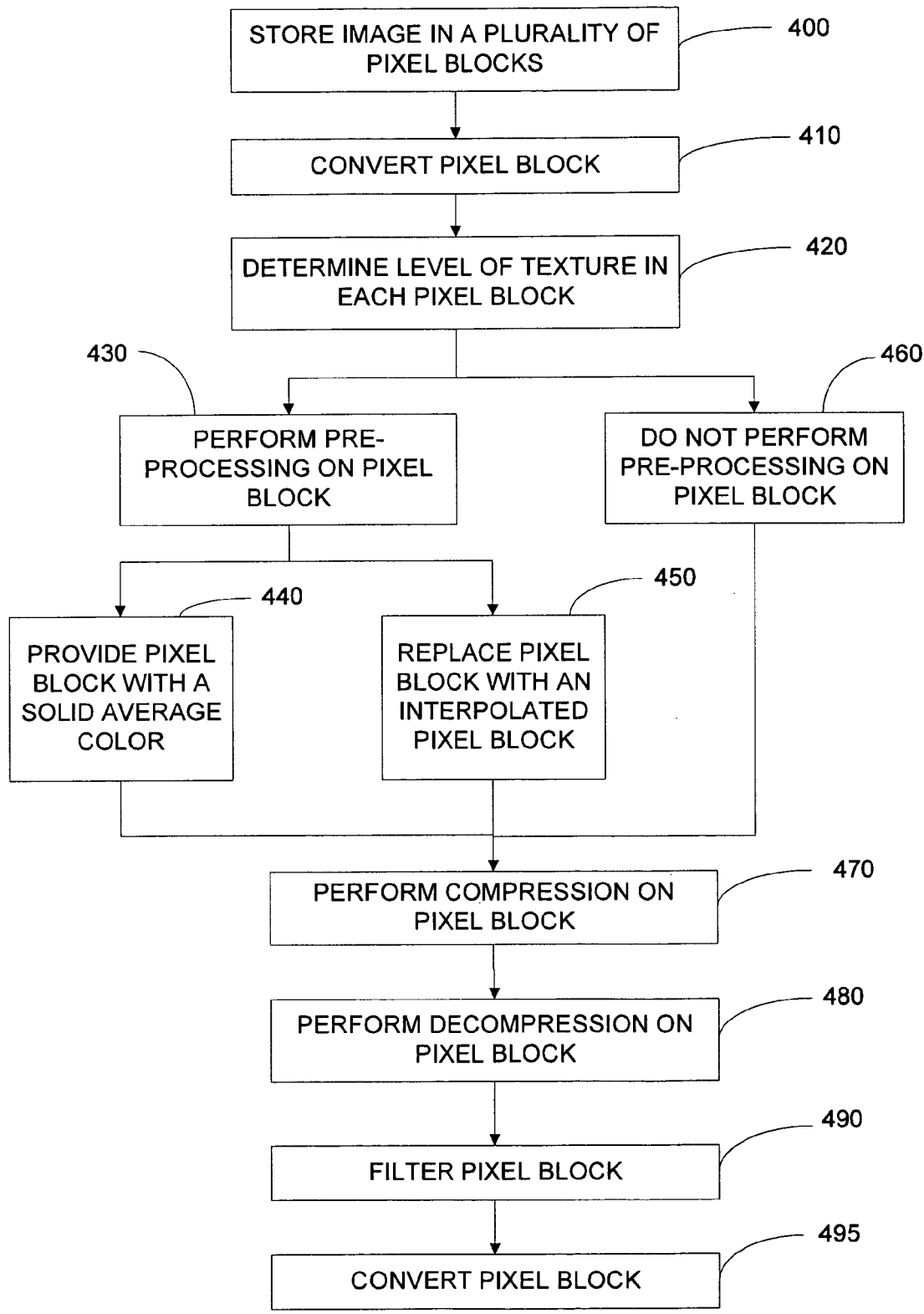
FIG. 4 is a flow diagram of an exemplary process for providing full compression of images.

FIG. 4 depicts a full processing mode for pixel blocks similar to the pre-processing method described above. While the image is stored as a plurality of pixel blocks (box 400), it will be appreciated that each pixel block (typically having a 4×4 configuration or 16 total pixels) is preferably converted to a larger pixel block (e.g., one having an 8×8 configuration or 64 total pixels) as represented in box 410. The process of the 4×4 to 8×8 conversion is similar to compressing an uncompressed input texture and converting it to a DXT format. One example of such conversion would be to analyze the 4 neighboring 4×4 blocks, determine their two anchor colors based on histogram, minimum or maximum color range, and then use these two colors as the two new anchor colors for the 8×8 block. The pixels of the 8×8 block would have the same bit-configuration for color and alpha indices as the 4×4 DXT blocks—except there would be 64 pixels instead of 16. Accordingly, the texture format of the pixel block is changed.

The texture level of each converted pixel block is then determined (box 420), but it will be appreciated that, for the 8×8 blocks, there will be 3 color and alpha (if the texture format supports alpha) thresholds used. The first threshold, used to convert an 8×8 block to a single color, is an input parameter. The $2^{nd}$ threshold is derived from the first threshold either by a fixed ratio or other suitable formula, such that it can process higher texture level blocks. The 8×8 blocks that are processed through the $2^{nd}$ threshold are converted to lower resolution 2×2 blocks (i.e., 4 interpolated pixels scaled up to 64 pixels). The $3^{rd}$ threshold is derived from the $2^{nd}$ again by a fixed ratio or other formula such that it can process even higher texture level blocks than the $2^{nd}$ threshold. The 8×8 blocks that pass through the $3^{rd}$ threshold are converted a lower resolution 4×4 blocks.

As discussed with respect to FIG. 2, pre-processing preferably is performed on the converted pixel block provided the converted pixel block has less than a predetermined amount of texture level (box 430). Depending upon the texture level determined for the converted pixel block, either the converted pixel block is provided with a single (solid) color (box 440) or it is replaced with an interpolated pixel block (box 450). If the converted pixel block has at least the predetermined amount of texture level, then it is preferred that no pre-processing of the converted pixel block be performed (box 460).

In any event, compression is preferably performed on the converted pixel block (box 470), such as by the LZX lossless compression algorithm or by any suitable lossless codec. Of course, the converted pixel block must also be decompressed (box 480) prior to being displayed. The pixel block preferably undergoes filtering (box 490) during decompression in order to improve its quality. The purpose of the filtering is to smooth previously converted texture blocks. The filter works as follows: first it looks for converted texture blocks, then it samples the color or alpha from neighboring blocks. If the neighboring blocks colors are similar to the current block, then it uses these colors to create a smooth blend from top, left, bottom and right sides of the block. The similarity threshold is derived from the original color or alpha threshold used to compress the texture. In addition, the converted pixel block must be converted back into the standard size (box 495) or from the 8×8 configuration to the 4×4 configuration. By implementing the additional conversion steps (boxes 410 and 495) to the standard format of the pixel blocks, a substantial amount of storage is saved. It is estimated that approximately 30-40% less memory would be required due to the conversion of the pixel block to the 8×8 configuration alone, with the texture becoming approximately 70-80% smaller than the original DXT texture when the pre-processing is also employed. These savings are achieved without any visually susceptible image quality losses.

Figure 3:
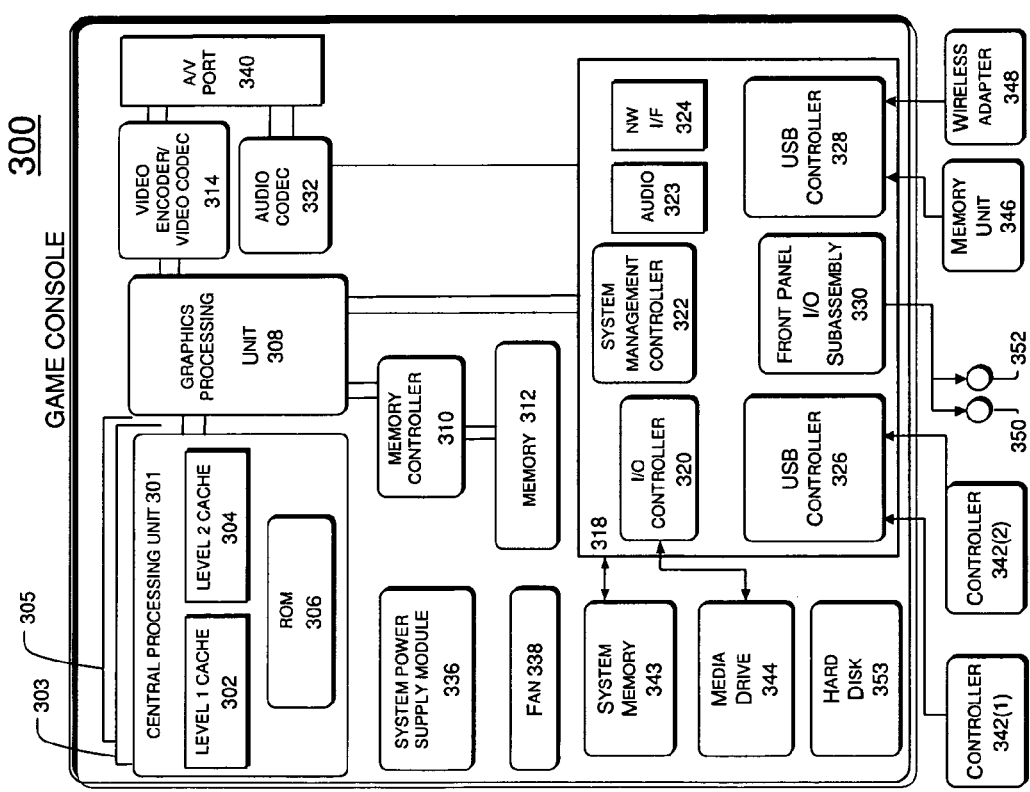
FIG. 3 is a depiction of a suitable computing environment in which compression of images can be implemented.

Besides being usable with the video user interface 190 in computer apparatus 100 described in accordance with FIG. 1, the methods and algorithms disclosed above may be utilized with an exemplary game console 300 (see FIG. 3). Game console 300, along with other devices described herein, such as a display device, are capable of performing the functions needed to accomplish compression of images. A typical game console comprises hardware and software that are specifically designed to support a core set of usage scenarios.

Game console 300 has a central processing unit (CPU) 301 having a level 1 (L1) cache 302, a level 2 (L2) cache 304, and a flash ROM (Read-only Memory) 306. The level 1 cache 302 and level 2 cache 304 temporarily store data and hence reduce the number of memory access cycles, thereby improving processing speed and throughput. The flash ROM 306 can store executable code that is loaded during an initial phase of a boot process when the game console 300 is initially powered. Alternatively, the executable code that is loaded during the initial boot phase can be stored in a FLASH memory device (not shown). Further, ROM 306 can be located separate from CPU 301. Game console 300 can, optionally, be a multi-processor system; for example, game console 300 can have three processors 301, 303, and 305, where processors 303 and 305 have similar or identical components to processor 301.

A graphics processing unit (GPU) 308 and a video encoder/video codec (coder/decoder) 314 form a video processing pipeline for high speed and high resolution graphics processing. Data is carried from the graphics processing unit 308 to the video encoder/video codec 314 via a bus. The video processing pipeline outputs data to an A/V (audio/video) port 340 for transmission to a television or other display device. A memory controller 310 is connected to the GPU 308 and CPU 301 to facilitate processor access to various types of memory 312, such as, but not limited to, a RAM (Random Access Memory).

Game console 300 includes an I/O controller 320, a system management controller 322, an audio processing unit 323, a network interface controller 324, a first USB host controller 326, a second USB controller 328 and a front panel I/O subassembly 330 that may be implemented on a module 318. The USB controllers 326 and 328 serve as hosts for peripheral controllers 342(1)-842(2), a wireless adapter 348, and an external memory unit 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless interface components including an Ethernet card, a modem, a Bluetooth module, a cable modem, and the like.

System memory 343 is provided to store application data that is loaded during the boot process. A media drive 344 is provided and may comprise a DVD/CD drive, hard drive, or other removable media drive, etc. The media drive 344 may be internal or external to the game console 300. When media drive 344 is a drive or reader for removable media (such as removable optical disks, or flash cartridges), then media drive 344 is an example of an interface onto which (or into which) media are mountable for reading. Application data may be accessed via the media drive 344 for execution, playback, etc. by game console 300. Media drive 344 is connected to the I/O controller 320 via a bus, such as a Serial ATA bus or other high speed connection (e.g., IEEE 3394). While media drive 344 may generally refer to various storage embodiments (e.g., hard disk, removable optical disk drive, etc.), game console 300 may specifically include a hard disk 352, which can be used to store game data, application data, or other types of data, and on which the file systems depicted in FIGS. 3 and 4 may be implemented.

The system management controller 322 provides a variety of service functions related to assuring availability of the game console 300. The audio processing unit 323 and an audio codec 332 form a corresponding audio processing pipeline with high fidelity, 3D, surround, and stereo audio processing according to aspects of the present subject matter described herein. Audio data is carried between the audio processing unit 323 and the audio codec 326 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the game console 300. A system power supply module 336 provides power to the components of the game console 300. A fan 338 cools the circuitry within the game console 300.

The CPU 301, GPU 308, memory controller 310, and various other components within the game console 300 are interconnected via one or more buses, including serial and parallel buses, a memory bus, a peripheral bus, and a processor or local bus using any of a variety of bus architectures.

When the game console 300 is powered on or rebooted, application data can be loaded from the system memory 343 into memory 312 and/or caches 302, 304 and executed on the CPU 301. The application can present a graphical user interface that provides a consistent user experience when navigating to different media types available on the game console 300. In operation, applications and/or other media contained within the media drive 344 may be launched or played from the media drive 344 to provide additional functionalities to the game console 300.

The game console 300 may be operated as a standalone system by simply connecting the system to a television or other display. In this standalone mode, the game console 300 may allow one or more users to interact with the system, watch movies, listen to music, and the like. However, with the integration of broadband connectivity made available through the network interface 324 or the wireless adapter 348, the game console 300 may further be operated as a participant in a larger network community.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A computer-readable storage medium having stored thereon computer-executable instructions for performing a process comprising:
   storing an image in a plurality of pixel blocks;
   determining a level of texture in each pixel block;
   performing a processing function on the pixel block if the texture level thereof is less than a predetermined amount; and
   ignoring the processing function on the pixel block if the texture level thereof is more than a predetermined amount.

2. The computer-readable storage medium of claim 1, the process further comprising:
   identifying a first color in the pixel block having a highest luminescence value;
   identifying a second color in the pixel block having a lowest luminescence value;
   determining a luminescence difference between the luminescence value of the first color and the luminescence value of the second color in the pixel block; and,
   correlating the luminescence difference to a texture level for the pixel block.

3. The computer-readable storage medium of claim 2, the process further comprising:
   assigning a single color for the pixel block.

4. The computer-readable storage medium of claim 3, wherein the single color is an average color for the pixel block.

5. The computer-readable storage medium of claim 2, the process further comprising:

replacing the pixel block with a second pixel block having less resolution.

6. The computer-readable storage medium of claim 5, wherein the second pixel block is smaller than the Currently Amended block of pixels.

7. The computer-readable storage medium of claim 1, the process further comprising: determining a level of transparency for the pixel block.

8. The computer-readable storage medium of claim 1, the process further comprising:
analyzing non-pattern areas in the pixel block.

9. The computer-readable storage medium of claim 1, the process further comprising:
converting the pixel block from a 4×4 configuration to an 8×8 configuration prior to said texture level determining step.

10. The computer-readable storage medium of claim 9, the process further comprising:
decompressing the pixel block.

11. The computer-readable storage medium of claim 10, the process further comprising:
converting the pixel block from the 8×8 configuration to the 4×4 configuration during decompression of the pixel block.

12. The computer-readable storage medium of claim 11, the process further comprising:
filtering the pixel block during decompression to improve resolution.

13. A computer-readable storage medium having stored thereon computer-executable instructions for performing a process comprising:
storing an image in a plurality of pixel blocks;
determining a level of texture in each pixel block;
performing a processing function on the pixel block if the texture level thereof is less than a predetermined amount; and
analyzing non-pattern areas in the pixel block.

14. The computer-readable storage medium of claim 13, the process further comprising:
identifying a first color in the pixel block having a highest luminescence value;
identifying a second color in the pixel block having a lowest luminescence value;
determining a luminescence difference between the luminescence value of the first color and the luminescence value of the second color in the pixel block; and,
correlating the luminescence difference to a texture level for the pixel block.

15. The computer-readable storage medium of claim 14, the process further comprising:
assigning a single color for the pixel block.

16. The computer-readable storage medium of claim 15, wherein the single color is an average color for the pixel block.

17. The computer-readable storage medium of claim 14, the process further comprising:
replacing the pixel block with a second pixel block having less resolution.

18. The computer-readable storage medium of claim 17, wherein the second pixel block is smaller than the original block of pixels.

19. The computer-readable storage medium of claim 13, the process further comprising: determining a level of transparency for the pixel block.

20. A method for improved texture management comprising:
storing an image in a plurality of pixel blocks;
determining a level of texture in each pixel block;
performing a processing function on the pixel block if the texture level thereof is less than a predetermined amount; and
ignoring the processing function on the pixel block if the texture level thereof is more than a predetermined amount.

\* \* \* \* \*